United States Patent [19]
Trier

[11] Patent Number: 5,368,903
[45] Date of Patent: Nov. 29, 1994

[54] AN IMPROVED DECORATIVE MOLDED STRIP ELEMENT

[76] Inventor: Lothar Trier, Sudetenstrasse 1, D-8626 Michelau, Germany

[21] Appl. No.: 197,662

[22] Filed: Feb. 17, 1994

Related U.S. Application Data

[63] Continuation of Ser. No. 887,238, May 19, 1992, abandoned, which is a continuation-in-part of Ser. No. 445,723, Nov. 17, 1989, abandoned.

[30] Foreign Application Priority Data

Mar. 19, 1988 [DE] Germany ............... 3809344
Jul. 1, 1988 [DE] Germany ............... 3822399

[51] Int. Cl.⁵ .................................... B60R 13/04
[52] U.S. Cl. ........................ 428/31; 428/83; 428/157; 428/158; 428/156; 428/192; 428/77; 428/457; 428/122; 293/128; 52/716.5; 52/716.6; 52/716.7
[58] Field of Search .............. 428/31, 83, 157, 158, 428/156, 192, 77, 457, 122; 293/128; 52/716.5, 716.7, 716.6

[56] References Cited

U.S. PATENT DOCUMENTS

| | | | |
|---|---|---|---|
| 4,113,295 | 9/1978 | Wenrick | 428/31 X |
| 4,161,853 | 7/1979 | Weiss et al. | 52/288 |
| 4,220,681 | 9/1980 | Narita | 428/31 |
| 4,542,926 | 9/1985 | Treber et al. | 293/128 |
| 4,548,843 | 10/1985 | Kozuka et al. | 428/31 |
| 4,563,374 | 1/1986 | Treber et al. | 428/31 |
| 4,576,773 | 3/1986 | Azzola et al. | 264/174 X |
| 4,617,209 | 10/1986 | Ives | 428/31 |
| 4,654,238 | 3/1987 | Yamazaki et al. | 428/31 |
| 4,963,403 | 10/1990 | Roberts et al. | 428/31 |
| 5,013,596 | 5/1991 | Kessler | 428/122 |

FOREIGN PATENT DOCUMENTS

| | | |
|---|---|---|
| 0084629 | 8/1983 | European Pat. Off. . |
| 0108879 | 5/1984 | European Pat. Off. . |
| 0118397 | 9/1984 | European Pat. Off. . |
| 593893 | 9/1925 | France . |
| 2076314 | 10/1971 | France . |
| 1700842 | 3/1955 | Germany . |
| 2125989 | 12/1971 | Germany . |
| 2043272 | 3/1972 | Germany . |
| 6950343 | 12/1972 | Germany . |
| 2136108 | 2/1973 | Germany . |
| 2930850 | 2/1981 | Germany . |
| 2945481 | 5/1981 | Germany . |
| 3010911 | 10/1981 | Germany . |
| 3241906 | 5/1984 | Germany . |
| 3415379 | 11/1985 | Germany . |
| 3544217 | 6/1987 | Germany . |
| 8706438 | 7/1987 | Germany . |
| 8716836 | 3/1988 | Germany . |
| 8811467 | 12/1988 | Germany . |
| 0059538 | 4/1984 | Japan ............... 428/31 |
| 2072103 | 9/1981 | United Kingdom ............... 428/31 |

*Primary Examiner*—William Watkins, III
*Attorney, Agent, or Firm*—Anderson Kill Olick & Oshinsky

[57] ABSTRACT

A self-supporting structural element for cladding, decorating, protecting and/or sealing housings or bodywork of vehicles with at least one axial end which is integrally molded without any transition and is made up of a strip or panel-like synthetic plastics body having webs bearing on the housing and which includes an integrated reinforcement of hard material and also softly resilient bearing elements, the reinforcement consisting of narrow strips of metal plate coated with a hard synthetic plastics material and of a mineral fiber reinforced material or a hard synthetic plastics material which on the inside of the webs of the structural element which bear on the housing or the like are connected to these latter in the same substance and which have at least one lip of softly resilient material which bears on the housing or the like.

30 Claims, 9 Drawing Sheets

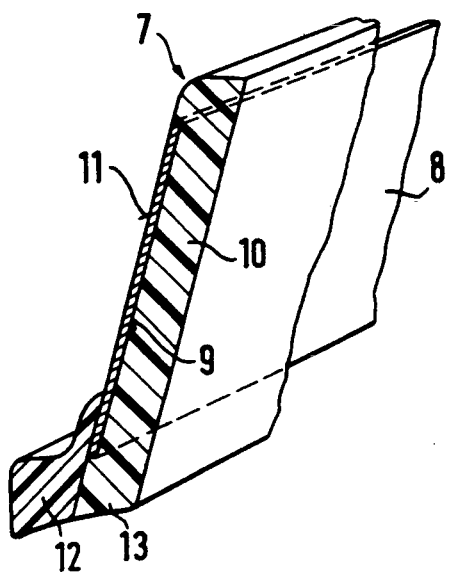
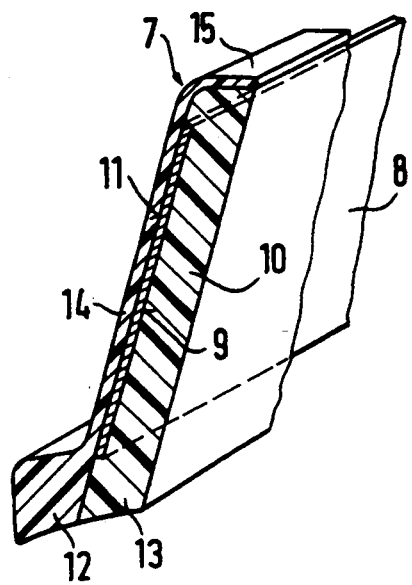
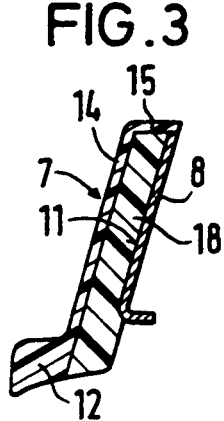
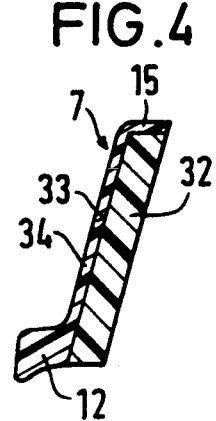
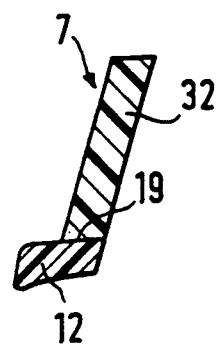
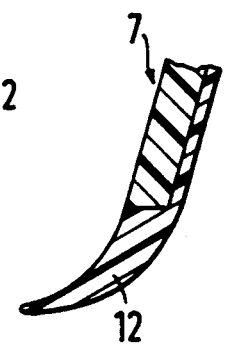
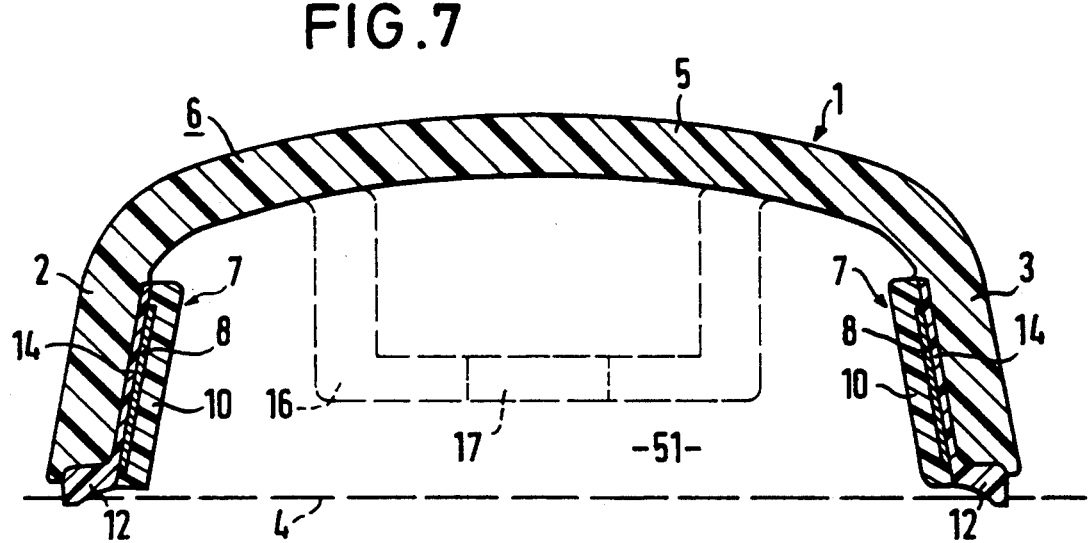

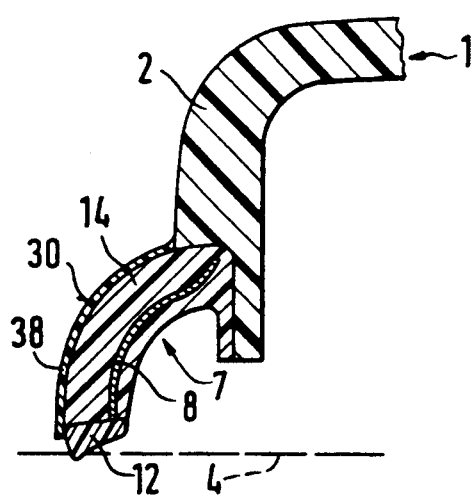
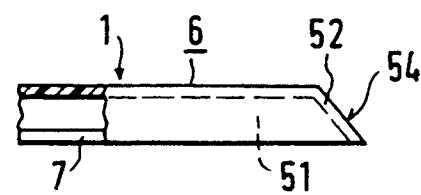
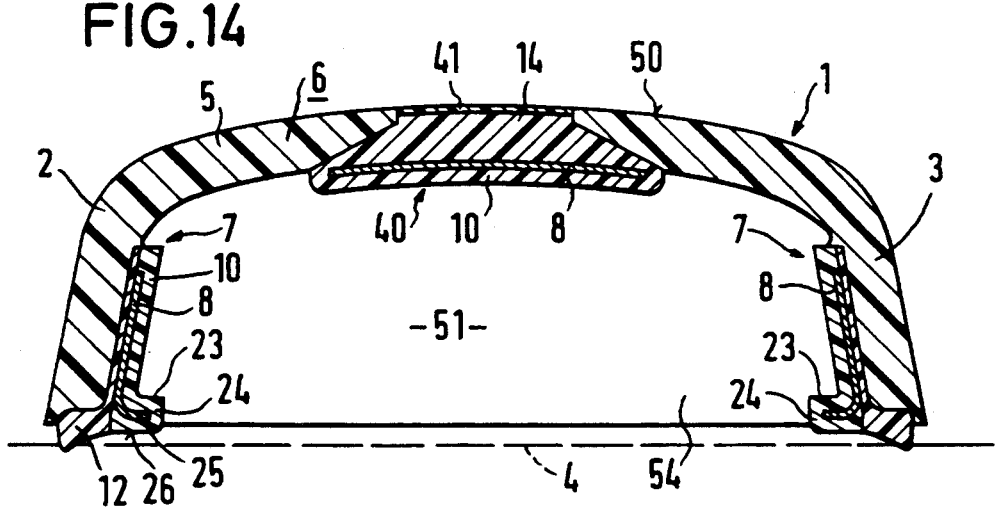
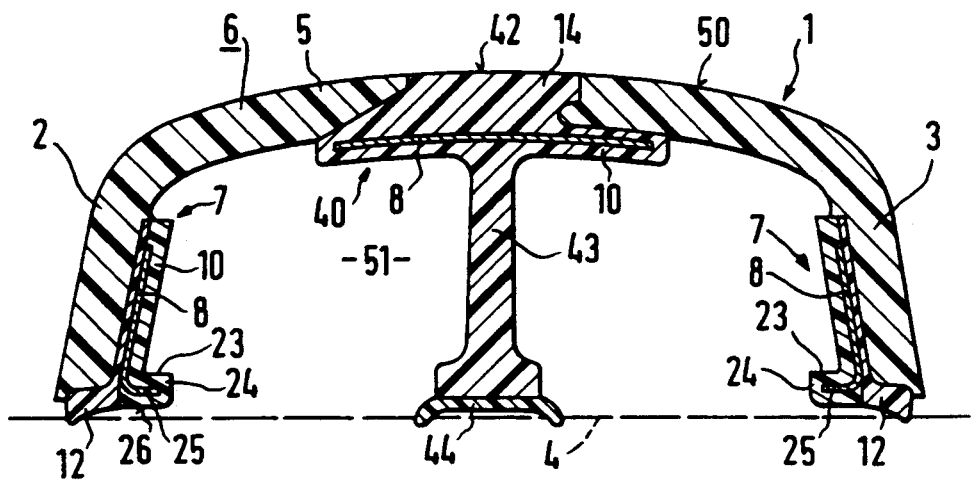

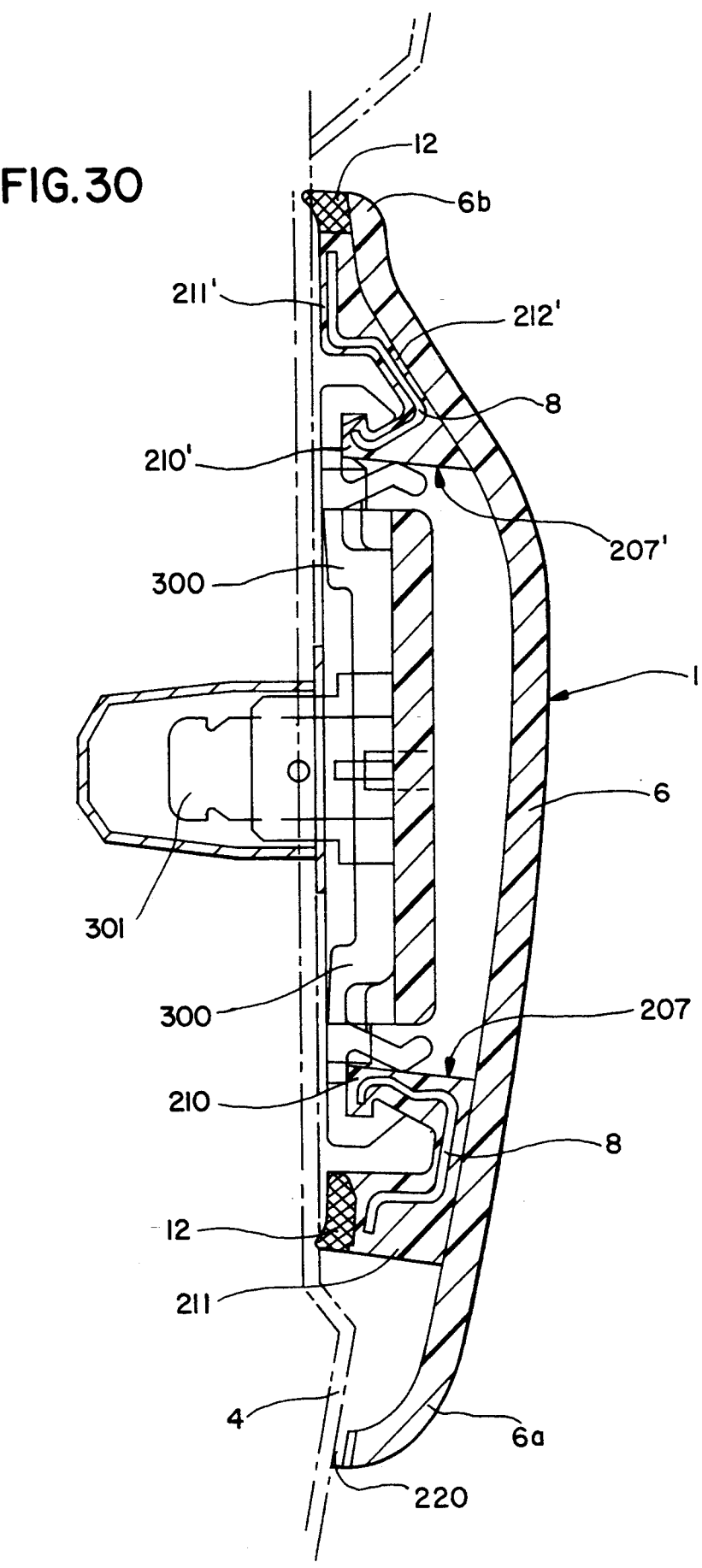

AN IMPROVED DECORATIVE MOLDED STRIP ELEMENT

This is a continuation application of Ser. No. 07/887,238, filed May 19, 1992, which in turn is a continuation-in-part application of Ser. No. 07/445,723, filed Nov. 17, 1989 abandoned.

The invention relates to a synthetic plastics structural component for mounting on a carrier, particularly on a bodywork or on a housing, as a protective element and/or sealing element, comprising a strip-like or panel-like sealing element with at least one web, the body of the structural element having the region of the at least one web bearing on the carrier.

Such a structural element or structural component is used, for example, as a lateral protective strip or also as a shock-absorbing bumper, preferably at the front and rear of motor vehicle bodies. It can, however, be used wherever a bodywork or housing of instruments or equipment requires, possibly for protective purposes or even on aesthetic grounds, or as a cladding or sealing of two adjacently disposed housing parts. The term "component part" must here be understood in the widest sense of the word. It may quite well be a long substantially bar-like narrow structural part or even a part which is of a more compact design and of a shorter length. These components do, however, also serve design purposes, mainly in vehicle construction, in that they are used as reinforcing elements, particularly on large-area parts of the bodywork.

The currently usual so-called scuffing strips or shock-absorbing strips often consist of an inlay of stainless steel sheet on which, after a complicated preparation, a separate or single multi-part synthetic plastics profile which is generally produced by extrusion is affixed by adhesion. Such a structure is initially disadvantageous by reason of its high weight, and on the other it is expensive due to the high-grade sheet metal used.. This is likewise true of another construction in which a synthetic plastics covering is extruded onto a stainless steel sheet. The shock absorbing strips extend and merge into the surface of the bodywork part which carries them. Such parts cannot be produced by extrusion but are generally separately produced as injection moulded parts and are mounted on the shock absorbing strip in a separate process. In a preferred method of working, the ends of the strips which are prefabricated by extrusion from the sheet metal section and the synthetic plastics coating are placed in an injection mold, whereupon the end part is integrally molded on, with a self-substance retention. This measure takes into account not only the connection of the two parts of the shock absorbing strip but also the shape of such end parts which can often be quite complicated due to the need for adaptation to the bodywork. Certainly, the clearly visible seam between the prefabricated strip member and the integrally molded end part is disturbing in its effect. In use, cladding parts are subjected to extremely high fluctuations in temperature, in fact not only with motor vehicles but also in the case of instrument housings which often contain equipment which generates considerable heat. The synthetic plastics material is subject to substantial heat expansion which can only be accommodated in such components if stiffening or reinforcing metal elements are incorporated into them. For example, if on grounds of weight and/or savings on cost, it is desired to dispense with stiffening metal reinforcements, it is possible to use mineral fibre reinforced synthetic plastics or certainly the use of mainly mineral additives to the synthetic plastics material. Thus, the latter becomes brittle and sacrifices a substantial degree of its shock absorbing effect. Fiber reinforcement equally results in an unattractive surface in the same way as, although to a lesser degree, the use of mineral additives. A further problem arises when using comparatively hard or additive-reinforced synthetic plastics due to the face that such components bear on enamelled surfaces. In consequence, not only does the sensitive enamelled surface suffer mechanical damage but there are also disturbing noises which are unacceptable, especially in the case of motor vehicle manufacture where the aim is to .achieve a high degree of perfection. The use of less hard synthetic plastics presupposes the embedding of sheet metal reinforcements which in turn does not remedy the problem, while on the other it does not guarantee a tight seal of the outer webs against the bodywork.

Such component parts which are used for cladding, decoration, protection or sealing of housings or vehicle bodies are therefore extremely problem-prone structural parts which in many respects seem to call for improvement, on the one hand, in order to simplify their production and therefore reduce their costs, and, on the other hand, to rationalise manufacture and assembly and finally also to improve their efficiency, particularly in respect of reducing weight and improving operation above all in those applications where it is particularly important to protect the surfaces which carry these components.

DE-OS 20 43 272 disclosed a synthetic plastics structural element of the type mentioned at the outset in which the structural element body consists of a rubber plate 1 which is curved to a U-shaped cross-section, the lateral members of the U-shape (webs) being vulcanised into corresponding grooves in a fixing plate 3. The fixing plate 3 is an injection molded part. This known arrangement is intended to bridge the individual members of rails or articulated road trains. For applications where the maximum possible protection of the carrier surface is required, e.g. in the case of strips on motor vehicle bodies, the prior art construction is unsuitable. The fixing plate which is made from correspondingly hard material will, upon fluctuations in temperature, inevitably scrape against the surface of the carrier. Also the external aspects of the known construction are unsatisfactory for many cases, since the fixing plate is clearly recognisable from outside, whereas in many cases a completely regular exterior is desired, especially in the case of motor vehicle body strips. With a linear arrangement of the rubber bead which is known from DE-OS 20 43 272, the problem arises that both the axial ends are open.

SUMMARY OF THE INVENTION

The invention is based on the problem of providing a simply and inexpensively produced synthetic plastics structural element of the type mentioned at the outset and which, while having a pleasant outward appearance, permits of a reliable mounting on the carrier, such that the carrier surface is safeguarded.

This problem is resolved in that:
the structural element comprises a reinforcement consisting of at least one bar produced by extrusion from sheet metal coated with a hard material or from a mineral fiber reinforced plastics material or from a rigid plastics material, and in that the structural element body is integrally molded onto the at least one reinforcing bar, an end piece being integrally and without any transition molded on at least one axial end of the structural element body in the process, and in that the at least one bar is disposed on the inside face of the structural element body which is towards the interior of the structural element, and in that the at least one web of the structural element body is constructed with a marginal portion which touches or is at a minimal distance from the carrier.

The reinforcement in the area of the synthetic plastics structural element which bears on the carrier ensures an approximately equal coefficient of expansion of the structural element and the carrier in this area, so that changes of shape, particularly distortions or undulations of the synthetic plastics structural element in this area or even damage to paintwork caused by frictional displacement, can be avoided. The at least one reinforcing bar is generally not visible from outside. By virtue of the fact that the structural element body is injected onto the reinforcing bar, it becomes possible to produce an all-round enclosed synthetic plastics structural element with no disturbing transitional seams where it joins the end pieces. The therefore completely uniform structural element body extends down as far as the carrier, which in turn contributes to a pleasant appearance.

In order to close of the interior of the structural element outwardly, particularly to avoid the penetration of moisture, the at least one web or the at least one reinforcing bar may, in the region of the web, be constructed with a softly resilient supporting layer which bears on the carrier. It is particularly preferred for the at least one web or the at least one reinforcing bar to be constructed in the region of the web with a sealing lip which rests on the carrier.

The construction of this component part, according to the invention, employs the reinforcement or stiffening which guarantees stability of shape of the component in those areas which bear on the housing, the bodywork or the like, it being immaterial whether this reinforcement of the component consists of sheet metal or mineral fiber reinforced synthetic plastics material. This latter may, for example, contain glass fibers or carbon fibers as a reinforcing means. In any case, however, the reinforcing part is an initially independent component which is only subsequently combined on a self-substance basis with the synthetic plastics body to produce the component, and in fact is joined thereto at those places where the reinforcement achieves the greatest possible effect for the stability of the shape and strength of the component. It is of vital importance that the reinforcing part can be provided with an integrated marginal lip or the like of softly resilient material which, after the reinforcing bar and the synthetic plastics body have been joined, is positioned on those surfaces of the web of the component which are in a bearing relationship with another surface. In contrast to the components which are comparable with or which are part of the state of the art, the structural element according to the invention comprises an integrated softly resilient bearing and/or sealing lip at those edges on which the component bears on the bodywork or other surfaces which are to be clad, ensuring not only a reliable and possibly also sealing-tight connection but also an effective protection of the usually especially sensitive bearing surface. In contrast to hitherto known sealing lips which are clamped in a form-locking manner or which may even be glued onto the edge of cladding strips, the component according to the invention comprises, integrated into it in a self-substance manner, a softly resilient lip which imparts better qualities to the component when this is in use.

It is in line with the basic idea underlying the invention that the reinforcing bars should be produced by extrusion but also possibly by injection molding and that the synthetic plastics body should be integrally molded onto the reinforcing bars. The extrusion technique makes it possible in a particularly simple manner to produce reinforcing strips and bars, particularly those which consist of two or more materials of, for instance, different hardness. Thus, the coating of the major part of the reinforcing bar, if this does not consist of fiber reinforced synthetic plastics material, may consist of a comparatively hard synthetic plastics material, whereas the part of the reinforcing bar which projects over the reinforcing bar and forms the rim which bears on the component is softly resilient and fulfills in an outstanding manner the function of resting on the component for which the cladding is intended. The synthetic plastics body itself is not extruded, however, being rather more suitably produced by injection molding, the prefabricated reinforcing bars being placed in the injection mold in their predetermined and invariable position. During the injection molding process, a self-substance connection is established between the two synthetic plastics. A form-locking connection of two synthetic plastics materials does, however, presuppose their compatibility. The metal reinforcement in the reinforcing bars is advantageously coated at least on the surface which faces inwardly into the component. Also, the softly resilient lip can be integrally molded onto this coating. Another alternative is for the metal reinforcement to be coated with the softly resilient material at least in the bottom part of the outwardly directed surface. The metal reinforcement can, however, also be uncoated on its inner surface. It goes without saying that the coating with this material may also embrace the entire outer surface of the metal reinforcement. If the metal reinforcing bar has no metal reinforcement, in other words if it consists of a synthetic plastics material preferably reinforced with glass fiber or carbon fiber if it consists of a hard synthetic plastics material with no additional reinforcement, then a coating is per se dispensable. It is only necessary for the lip which bears on the housing or the like and which consists of softly resilient synthetic plastics material to be provided in the bearing zone. Naturally, this construction makes it obviously necessary for such a reinforcing bar to be coated at least on one side, on the outside or on the inside, with a softly resilient synthetic plastics material which expediently also forms the softly resilient lip at its bottom end.

According to another feature of the invention, the stable-shape engaging means on the reinforcing bars and intended for direct mounting on the housing or the like, or for fitment by means of additional supports, are integrally molded.

It falls within the scope of the invention to integrally mold on the inside of the reinforcing bars, elements which project into the inner cavity in the component and which serve to support the latter and on which the bearing surface consists of softly resilient material. This feature is particularly important where relatively wide components are concerned which require to be additionally supported between their outer webs. Similarly to this feature, the invention provides for elements such as knobs, flanges or the like which consist of the hard coating material to be integrally molded on the inside of the reinforcing bars in such a way that they project into the component in order to support it. Such fixing elements are known per se; they serve not only for the spatial fixing of the component in relation to the bodywork or other housing part but in particular also to draw the component firmly up against the surface. Therefore, in the case of a component of the type according to the invention there is nothing to prevent this because the component is provided with softly resilient lips along its bearing edges. Expediently, these fixing elements are likewise provided with a reinforcement which consists of metal or a mineral fiber.

It has been found to be particularly advantageous for the arrangement to be such that the external coating on the reinforcing bar extends at least partly as far as the outer surface of the synthetic plastics body. Thus, the invention opens up an expediently wide field of applications in that in fact by varying the choice of materials, it is possible to achieve a particularly aesthetic design of such a component. In a further development of this thought which underlies the invention, the outer surface or an outer layer of the coating on the reinforcing bar may be colored differently from the outer surface of the synthetic plastics body. In the simplest case, this provides an attractive decorative strip which is integrated into the component and which requires no additional procedure in order to be fitted. Naturally, it is also possible to dispose a plurality of differently colored decorative strips alongside one another.

It goes without saying that also at least the outer surface or layer of such a coating on the reinforcing bar may be colored differently from the color of the outer surface of the synthetic plastics body. It may be particularly advantageous for the outer surface of the reinforcing bar to have a surface with a metallic appearance.

Generally, the metal reinforcement will have a cross-section which becomes integrated into the contours of the component. It extends then substantially parallel with the bearing surfaces of the component when it is extended beyond their two bearing webs and merges to a greater or lesser degree into the curvature with the adjacent outer portions of the bridge on the component. However, it is also conceivable for the metal reinforcement to have a cross-section which diverges from the contours of the component should this be required on structural grounds.

Since the component according to the invention is often not only used on completely flat surfaces but also on surfaces which are curved in one or several directions, a further development of the invention envisages the metal reinforcement and/or the flange disposed on the inside of the reinforcing bar to have stamped out portions to allow the component to be bent.

For the application of the invention to components of relatively wide shape such as are used particularly in motor vehicle body construction, the reinforcing bars may, at the web of the component, be extended into the bridge part which connects the two webs and they may be connected in a self-substance manner to this bridge part and extend from one web to the other. It is possible in this respect to envisage a diagonal guidance over the bridge part from one web to the other or perhaps an X-shaped connection of the two webs to each other.

Finally, it is within the framework of the invention for further reinforcing bars within the bridge part to be integrally molded on a self-substance basis, extending substantially parallel with the webs of the component. Also this design may be considered especially in the case of components of which the length is in inverse ratio to their width. These are mainly panel-like components of relatively considerable width but which are also used for cladding or decoration or for protecting or even for sealing housings, motor vehicle bodies or the like.

The above-described component according to the invention, intended for cladding housings or motor vehicle bodies, can generally be described as a synthetic plastics structural element for mounting on a carrier, particularly on bodywork or on a housing part and which is provided with at least one inlay member, particularly a reinforcing bar, consisting of a first material or a first combination of materials, on which there is integrally molded a structural element body consisting of a synthetic plastics material which is a second material, the structural element body being injection molded onto and only partially engaging around the at least one bearing member. In this connection, the term injection molding relates quite generally to a casting technique employing casting molds such as, for example, reaction-injection molding. In this case, mixtures of synthetic plastics materials, preferably polyurethane, are placed in the mold while cold and react in the mold to form a solid material, generally of the foam type.

A synthetic plastics structural element of the type just mentioned is known per se from DE-A-34 15 379. The inlay member in the form of a metal rail which is open towards the carrier and which has a C-shaped cross-section with a minimally thin layer of soft PVC synthetic plastics material, produced by an extrusion process, is placed in an injection casting mold and a structural element body of synthetic plastics material is injected around it in the form of two curved wings which project laterally from the metal rail. The edges of the wings bear on the carrier (the sheet metal bodywork). This synthetic plastics structural element is fixed to the carrier obviously by means of fixing elements which engage the C-shaped section. The axial ends of the prior art strip-like synthetic plastics structural element are obviously open.

By reason of the metal section inlay member, it is possible in fact to ensure that approximately the same heat-related variations in length of carrier and synthetic plastics structural element occur in the fixing area. However, this cannot be said of the lip-like edges of the structural element body which are remote from the reinforcement, so that markedly differing variations in length are produced by heat in the substantial range of temperatures which arise in the case of motor vehicle bodywork production. This excludes any possibility of the synthetic plastics structural element edge accurately fitting the carrier. The paintwork may suffer damage; disturbing vibrations may occur in the synthetic plastics structural element. There may be undulating distortions of the edges. It has been found that in the case of a strip with an initial length of 1 meter and which was provided with an aluminium strip reinforcement, the variation in length in the region of the reinforcement for a temperature rise from room temperature to 100° C., was in the region of 1.8 mm, while the non-reinforced edge of the strip, 70 mm from it, was lengthened by 4 mm, in other words by over 2 mm compared with the reinforcement (and with the sheet metal bodywork). Furthermore, when using the synthetic plastics structural element to protect the bodywork (for example as a lateral protective strip or as a shock absorber or bumper), a particular disadvantage is that if there is an impact on the known component in the region of the maximum projection, namely in the region of the C-shaped section rail, this impact is transmitted via the not very yielding rail directly to the sheet metal bodywork in which produces an appropriate deformation.

In order to avoid these disadvantages, it is suggested that the at least one inlay member which is constructed as a reinforcement for the synthetic plastics structural element should extend along a peripheral marginal portion of the synthetic plastics structural element and in that the inlay member or the structural element body be provided in the region of the peripheral marginal portion with a softly resilient support which bears on the carrier and which preferably takes the form of a sealing lip and/or a marginal lip which may possible be at a minimal distance from the carrier, the structural element body having at least one end piece which is axially and integrally molded thereon without any transition.

The reinforcement on the at least one peripheral marginal portion avoids differing thermal expansions of the synthetic plastics structural component and of the carrier in this critical connection zone. Thus, the more or less marked marginal undulations which are virtually unavoidable in the case of the prior art synthetic plastics structural element when this is exposed to fairly high temperatures, are reliably avoided. The dimensional stability of this synthetic plastics structural element according to the invention is enhanced since the peripheral marginal reinforcement reduces the shrinkage. Finally, also the age shrinkage of the synthetic plastics structural element is decidedly reduced, at least in the critical marginal zone. Between the marginal reinforcements, the synthetic plastics structural element is able to be elastically and/or plastically yielding so that impact loadings can be accommodated by the synthetic plastics structural element without any deformation of the carrier underneath.

In the case of prior art extruded synthetic plastics structural elements which may also be constructed to be reinforced by a reinforcing bar, an end piece is integrally molded onto it by an injection molding technique to form a pleasing end to the bar. If a cavity is formed in the extruded section or between the extruded section and the carrier, this cavity is closed off by the end piece. By way of adaptation to the particular use involved, the end piece may run out flat (for example, the hinge end of a lateral protective strip on a motor vehicle door). What is disturbing in the case of such prior art strips, however, is the visible transition between the extruded section and the integrally molded on end piece. The protective profile known from DE-A-34 15 379 is constructed with a cross-section which is uniform as it extends obviously as far as the relevant end; the profile is accordingly open at both ends.

In the case of the solution according to the invention, on the other hand, an end piece is envisaged which is axially integrally molded on without a transition, possibly closing off any cavity formed between the carrier and the structural element body. There is no transitional seam between the structural element body and the end piece, since both these parts are simultaneously and by an injection molding process formed on the at least one inlay member. A visually appealing transition is created between the structural element and the carrier which is capable also of compensating for manufacturing tolerances in the structural element and the carrier, since the inlay member or the structural element body is in the region of the peripheral marginal portion constructed with a softly resilient supporting layer which bears on the carrier. This preferably takes the form of a sealing lip with the advantage that it prevents moisture from entering the inner cavity.

The synthetic plastics structural element can be fixed directly on the carrier (by clips or adhesion) in the region between two oppositely disposed peripheral marginal portions; however, it is also possible to use a fixing plate adapted to be glued to the carrier and on which the synthetic plastics structural element can be mounted, for example clipped.

In order further to improve shock absorption, it is proposed that the structural element body, in the region between the peripheral marginal portions, have at least areas where there is a clear distance between it and the carrier or fixing plate, the end piece closing off the interior space formed inside the structural element body. This clear distance permits resilient yielding with an increased spring travel The inlay member may be an extruded part or an injection molded part; however, it is preferable to produce it "by the meter", using an injection molding process. The sealing lip provided on the inlay member can be molded at the same time the extrusion is being produced. This type of manufacture is substantially more favorable than, for example, injecting a sealing lip onto the structural element body which may consist of relatively hard synthetic plastics material, using an injection molding technique—with the extrusion process a slide which would be necessary for such an attachment type of injection molding and which would extend over the entire length of the component becomes unnecessary.

The inlay member according to the invention may perform accessory functions, particularly a decorative function.

The main function of the inlay member, namely the reinforcing function, presupposes a corresponding construction of the inlay member. In this respect, the construction of the inlay member as a preferably at least partially synthetic plastics coated metal section or metal plate is appropriate. However, the inlay member may also be constructed as a fiber reinforced, preferably glass fiber reinforced, synthetic plastics member or as a rigid synthetic plastics member.

The inlay member can, furthermore, be constructed with fixing projections and/or fixing recesses on which fixing elements engage for mounting the synthetic plastics structural element on the carrier.

In order to permit relatively large spans of synthetic plastics structural element, it is possible to envisage at least one of the inlay members being, in a middle portion of the structural element, spaced apart from the peripheral marginal portions. This inlay member may as purely a longitudinal strengthening of the synthetic plastics structural element be disposed at a distance from the carrier so that the shock absorption function is not in any way hampered. The inlay member can, however, also be constructed as a bracing web by which the middle portion of the synthetic plastics structural element is braced on the carrier and which is resilient in the bracing direction, possibly via a softly resilient supporting layer. By virtue of the resilience in the bracing direction, there is furthermore a certain shock absorption capacity in the region of the bracing web.

In the region of the peripheral edge, it is possible to provide parallel with the edge of the periphery an outwardly open groove preferably formed between the carrier and the structural element body which is maintained at a distance from the carrier by the inlay member. This groove can serve to accommodate a rim of a paintwork protective covering; it can however also serve to compensate for deviations of the manufacturing dimensions of the surface form of the carrier. Finally, a certain distance between structural element body and carrier is also needed if the synthetic plastics structural element is glued to the carrier. If the peripheral edge of the structural element body were to be supported on the carrier under initial spring tension, then in time this would lead to a loosening of the glued joint.

In the case of strip-like synthetic plastics structural elements, the inlay members preferably extend parallel with the longitudinal direction of the structural element.

In the case of panel-shaped synthetic plastics structural elements, a diagonal pattern of inlay members is also possible, perhaps with further inlay members on the lateral edges of the panels.

Finally, instead of the aforementioned glued joint (between inlay member and carrier) already mentioned, it is also possible to envisage connection via separate fixing elements which engage at least one of the inlay members, preferably via a catch connection.

Since the inlay members on both the mutually opposite longitudinal edges of the synthetic plastics structural element provide for the necessary stability of shape, the structural element body itself can be formed from a soft plastics material (i.e. using the soft synthetic plastics material). This also opens up a possibility of the fixing elements, for mounting the structural element on the carrier, imprinting on the structural body a predetermined shape, of which the cross-section preferably varies along a given direction, particularly the longitudinal direction of the elongated synthetic plastics structural element. In this way, it is possible to imprint a for example unidirectionally tapering form on the relatively soft structural element body produced with a constant cross-section (except for the end pieces) in the injection casting mold, by a corresponding reciprocal disposition of the fixing elements which engage mutually opposite longitudinal edges, in other words the structural element body.

To this end, it would be possible to fix the fixing elements separately at a corresponding distance from the carrier; assembly is however simplified if the fixing elements provided on both mutually opposite longitudinal edges are provided on a common fixing plate which is in turn capable of being mounted on the carrier (by adhesion or clips or the like).

A single reinforcing bar can be provided which in the case of a bridge-like structural element, extends from peripheral edge to peripheral edge. This embodiment is characterised by particular mechanical stability. Alternatively, it is also possible to provide two separate and spaced apart inlay members of which one extends in the region of a peripheral marginal portion while the other extends in the region of a peripheral marginal portion of the structural element body which is opposite it. The advantage of this arrangement is not only the saving on material but also the increased resilience under impact.

BRIEF DESCRIPTION OF THE DRAWINGS

Further features, details and advantages of the invention will emerge from the following description of some preferred embodiments of the invention which are shown in the accompanying drawings, in which:

FIG. 1 is a perspective broken away view of a reinforcing bar;

FIGS. 2 to 5 show various modified embodiments of this reinforcing bar;

FIG. 6 is a detail of a reinforcing bar;

FIGS. 7 to 11 show various embodiments of a component of the same type, all in section;

FIG. 13 is a modified detail of the embodiment shown in FIG. 12;

FIG. 13A is a greatly simplified broken away and partially sectional side view of a component according to the invention;

FIGS. 14 to 15 show two further modified forms of the component in section

FIG. 30 shows a further embodiment of the inventive component, in section.

DETAILED DESCRIPTION OF THE PREFERRED EMBODIMENTS

Figure 8:
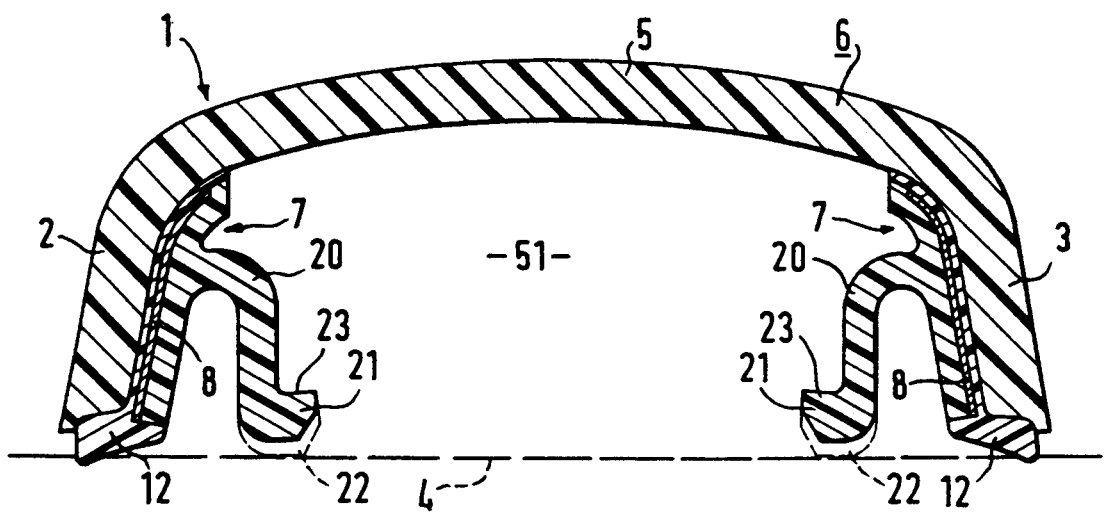

The figures of the drawings relate in the majority and purely by way of example to a component such as is used as a lateral strip on motor vehicle bodies. It is evident that the same principles of construction can also be applied to similar components which are possible suitable for other applications, be it for instance as a shock absorber on motor vehicles or as corresponding strips on housings for machines for instruments.

A lateral strip 1 intended for a motor vehicle has both webs 2 and 3 applied against a bodywork or housing surface 4 which is only shown by broken lines. Both webs 2 or 3 are connected by a bridge-like part 5 to form one unit. In conjunction with the two webs 2, 3, this forms one uniform synthetic plastics body 6 of comparatively rigid or hard synthetics plastics material, particularly a polyethylene, polypropylene or the like. This component 1 is reinforced in the region of its webs 2, 3, in fact by comparatively narrow strips 7 a plurality of different forms of which are shown in FIGS. 1 to 6. They contain a metal reinforcement 8 in the form of a strip of stainless steel or aluminium. This metal reinforcement 8 is naturally and after a suitable pretreatment, provided uniformly in these embodiments with a coating 10 of comparatively hard synthetic plastics material on the inner surface 9. In the case of the embodiment shown in FIG. 1, the outer surface 11 of the metal reinforcement 8 is not coated. Only at its bottom end is an integrally molded lip 12 of softly resilient material, for example a plastics material, which enters into a self-substance connection with the bottom end 13 of the rear coating 10. In the case of the embodiment shown in FIG. 2, on the other hand, there extends over the entire outer surface 11 of the strip-like metal reinforcement 8 a coating 14 of the same softly resilient synthetic plastics material as that of which the lip 12 at the bottom end consists. At the upper end of this reinforcing strip 7 according to FIG. 2, this coating 14 takes the form of a flag 15 and engages over the inner coating 10 of rigid synthetic plastics material. According to FIG. 3, the reinforcing strip 7 has, exposed on its inside face, i.e. uncoated, a metal reinforcement 8. On its outside, there is a coating 18 of rigid synthetic plastics, the outside of which is in turn covered by a coating 14 of softly resilient material corresponding to the embodiment shown in FIG. 2 and which in this case forms the lip 12 There is a self-substance type of connection between the synthetic plastics coating 14 and 18. The metal reinforcement 8 which is exposed on one side is in this case corrosion-free and non-rusting.

FIGS. 4 and 5 show two embodiments of the reinforcing bar 7 which is constructed without any metal reinforcement, its body (web 32) being instead made either from a mineral fiber reinforced plastics material or from a particularly hard synthetic plastics material, both of which impart corresponding stability to the component.

In the case of the reinforcing bar 7 in FIG. 4, a coating 34 of softly resilient material is integrally molded by the self-substance method on the outer surface 33 of the web 32, this material at the same time forming the lip 12 at the bottom end. In the case of the embodiment shown in FIG. 5, this additional coating is absent and in this case the lip 12 is integrally molded on the bottom end 19 of the web 32. The embodiment according to FIG. 6 shows only diagrammatically the fact that the reinforcing bar 7 which constructed in any desired manner may also have a substantially longer lip 12 at its bottom end. This embodiment is particularly suitable for applications where tolerances to be bridged are larger, so that in any case the softly resilient lip 12 ensures a tight contact against the relevant bodywork or housing part.

Reinforcing bars of this type are, in the case of the component 1, mounted on the inside of the webs 2 and 3, whereas with this embodiment the bridge part 5 of the component 1 is free from reinforcements. The reinforcing bar 7 is produced by extrusion. In this case, the individual elements, namely the coatings 10 and 14 and the synthetic plastics material of the lip 12 are connected to one another through the same substance and are rigidly connected to the metal reinforcement 8. Such a reinforcing bar 7 can, without any great complication, be accurately positioned in an injection casting mold so that the synthetic plastics body 6 can be integrally molded on the two reinforcing bars 7, a self-substance connection also being created in this case. These reinforcing bars lead to an effective stabilising of such a component 1 so that even under extreme temperature differences to which it may be exposed in use, the component only undergoes negligibly small variations in length. The webs 2, 3 only partly engage over the softly resilient lips 12 which are integrally molded on the reinforcing bars, so that the downwardly freely projecting portion of these lips 12 comes to bear on the bodywork or housing surface 4. A first example of attachment of such a component 1 on the bearing surface 4 is shown in FIG. 7. Here, integrally molded on the inside of the bridge part 5 and projecting into the inner cavity 51 in the synthetic plastics body 6 is a basket 16 into the window-like opening 17 in which is inserted a holder, the other end of which is connected to the bodywork surface 4 and which is known per se so that it is consequently not illustrated.

FIG. 8 shows an embodiment which is recommended for components 1 of relatively large cross-sectional width or where there is a particularly heavy loading substantially at right-angles to the supporting surface 4. Here there are formed on the inside of the reinforcing bar 7 flanges 20 which project into the inner cavity 51 in the synthetic plastics body 6 and which have at their free end a reinforced supporting head 21, the bottom bearing surface of which has a coating 22 of softly resilient material. This can substantially correspond to that which may be considered for the sealing lip 12 of the reinforcing bar 7. In the embodiment shown in the drawing, the supporting head 21 has a back taper 23 which possibly permits a catch-like engagement of a fixing element which is connected to the surface 4.

Figure 9:
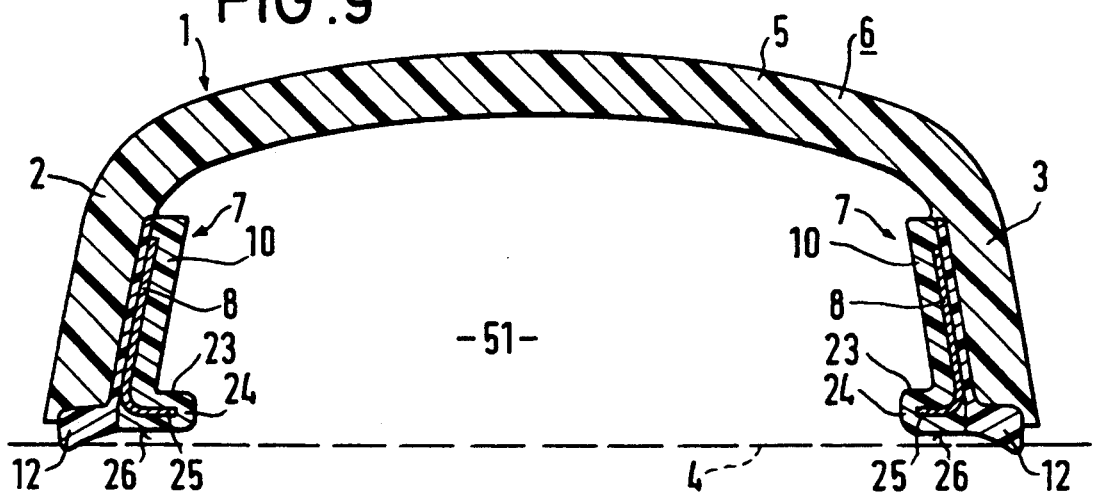

In the case of the embodiment shown in FIG. 9, the bottom end of the reinforcing bar 7 is provided with an inwardly directed projection 24. Furthermore, the metal reinforcement 8 is provided at its bottom end with an angled-over portion 25 which fits into this projection 24. Thus, the stabilising effect of the reinforcing bar 7 is enhanced in the same way as a stable back taper 23 which is provided for mounting the component 1 on the surface 4. Possibly, the underside 26 of the projection 24 can also in this case be provided with a coating of softly resilient material.

Figure 10:
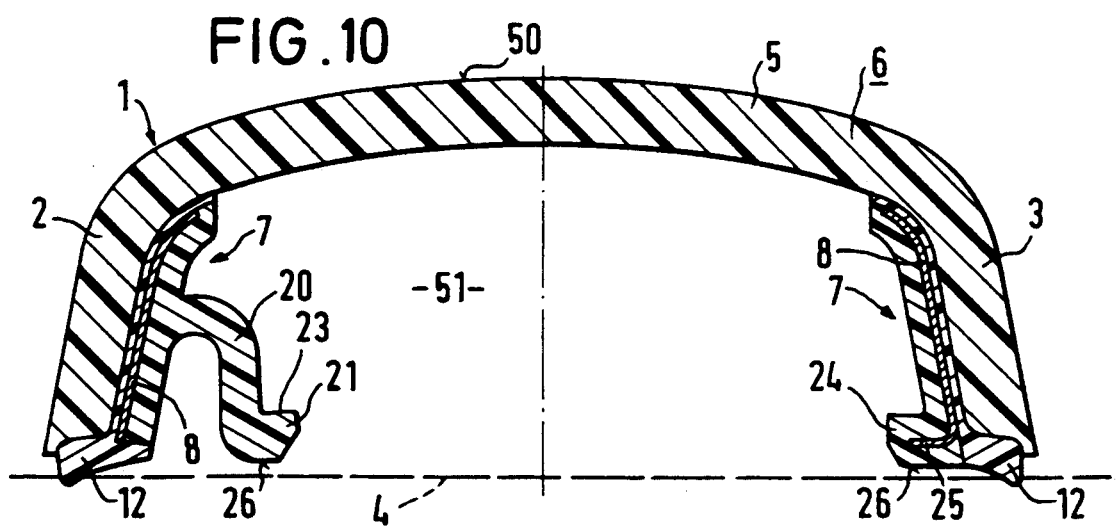

FIG. 10 combines not only the construction of, say, the reinforcing bars 7 from the aforedescribed embodiment FIGS. 4 and 5 in one component 1. The reinforcing bars 7 which differ in the webs 2 and 3 can also be constructed to conform in the two webs 2, 3. Here, furthermore, the reinforcing bars 7, with the metal reinforcements 8 integrated into them, are guided into the curvature between the web 2 or 3 and the bridge part 5 of the synthetic plastics body 6. This is only a reproduction shown by way of example. It goes without saying that the reinforcing bars 7 may also be extended farther upwardly into the bridge part 5.

Figure 11:
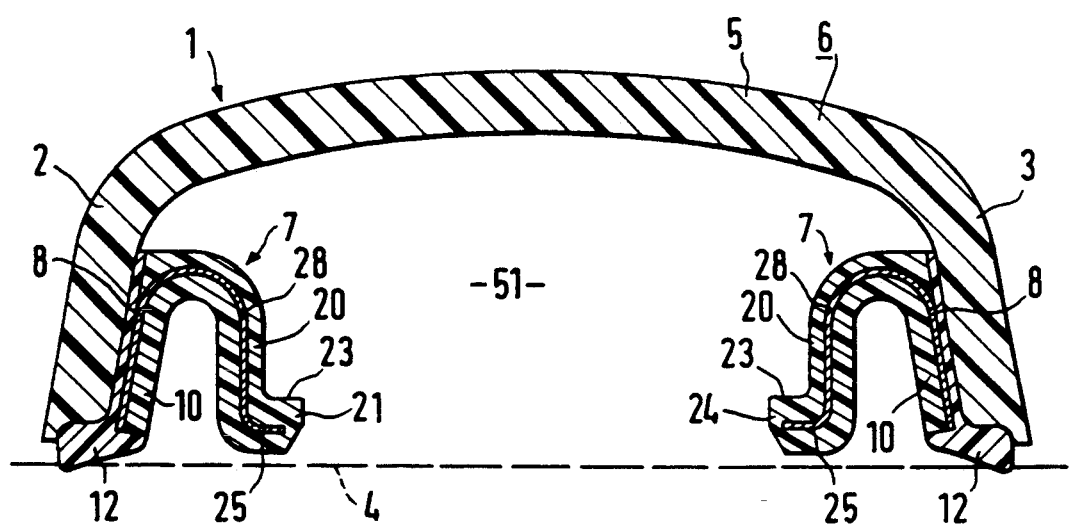

FIG. 11 shows a component with a further modified form of reinforcing bars 7. These are in turn provided with a flange 20 integrally molded on the inside face. In this case, however, the metal reinforcement 8 is U-shaped, the opening in the U pointing towards the bearing surface 4. The flange 28 formed on the metal reinforcement 8 extends inside the flange 20 which is molded on the inside coating 10 of the reinforcing bar 7 and strengthens this, including its head 21 or projection 24.

Figure 12:
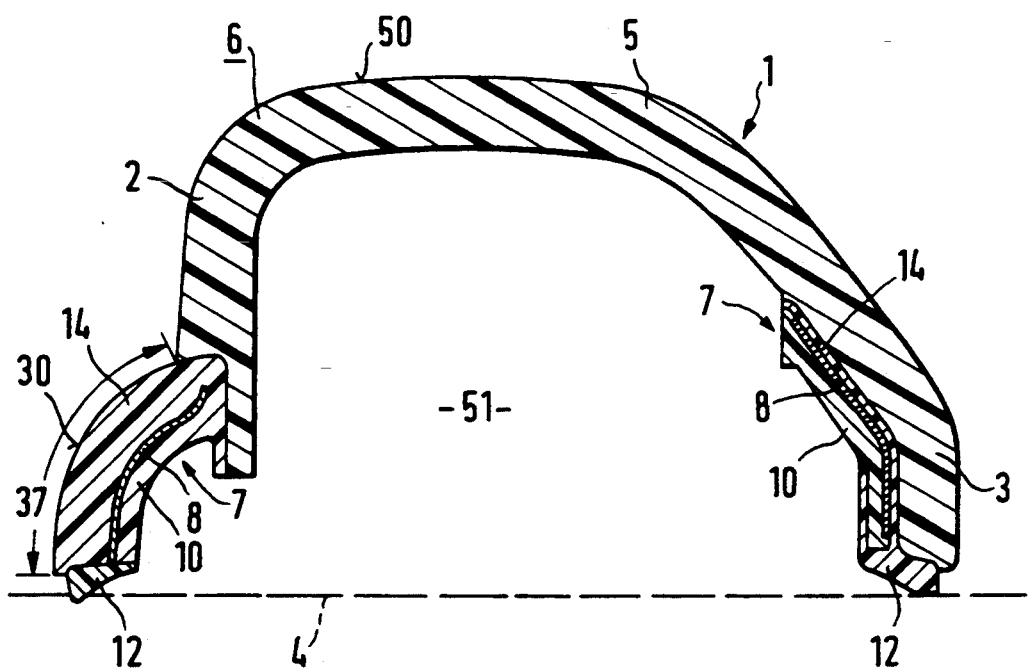
FIG. 12 shows a special embodiment, likewise in cross-section.

In the case of the component shown in FIG. 12, two different reinforcing bars 7 are used. The bar 7 on the right of the picture has a shape corresponding to the above-described embodiment, namely a metal reinforcement 8 with an inner coating 10 of harder synthetic plastics material and an external coating 14 of a softer material. The softly resilient lip 12 is integrally molded on both coatings 10, 14. The synthetic plastics body 6 is by its web 3 injection molded by the same substance onto the outer coating 14. The reinforcing bar 7 shown on the left in FIG. 12 is of the same basic construction. The only differently substantially S-shaped metal reinforcement 9 has the coating 10 on its inside surface. The outer coating 14 may also consist of a softly resilient material and is substantially thicker and in this case forms a part of the web 2 of the component 1. The outer surface 30 of this coating 14 is at the same time the outer surface of the web 2 of the component 1. In the case of the embodiment shown, if the web 3, a part of the web 2 and the bridge part 5 of the component 1 consist, for example, of a black synthetic plastics material, while the outer coating 14 on this reinforcing bar 7 is on the other hand colored, being, for instance, red, then once the component 1 has been mounted on the bodywork part 4, the externally visible surface 30 of the coating 14 on this reinforcing bar 7 will in the region 37 appear to be a colored decorative strip on the component 1. The lip 12 may, on the other hand, be black in color. With this embodiment, the metal reinforcement 8 in the reinforcing bar 7 has on both sides, both inside and outside, a uniform coating of one and the same synthetic plastics material. FIG. 13 shows an embodiment which differs from this special construction and in this case the outer coating 14 of the metal reinforcement 8 has an outer covering coating 38. Nevertheless, in order to remain with the aforementioned example, it is sufficient just to have this coating 13 in a different color to create the desired decorative strip effect. Possibly, this coating 38 may also be extremely thin and may possibly consist of an outer covering film. This is particularly appropriate if a metallic-looking outer surface 30 is required.

A further alternative is shown in FIG. 14 where the two webs 2 and 3 of the component 1 are constructed in accordance with one of the previously described embodiments. In addition, in this case, a further reinforcing bar 40 is introduced into the bridge part 5 of the synthetic plastics body 6 and this again consists of a metal reinforcement 8 with an inner coating 10 and an outer coating 14. Integrally molded thereon in the same substance is once again a covering coating 41 which can, for example, be colored differently from the outer surface of the synthetic plastics body 6, including its webs 2, 3, or it may have a different surface structure in order again to create a decorative strip effect. Instead of this covering layer 41, however, it is also possible for the material of the bridge part 5 of this synthetic plastics body 6 to have a coating injected onto it. The reinforcing bar 40 would then only serve to strengthen this component 1. Such an additional reinforcement in the bridge part 5 is also shown in the embodiment in FIG. 15 and here again the outer coating 14 of the reinforcing bar 40 extends as far as the outer surface 42. If the coating material is of a color other than that used for the outside of the synthetic plastics body 6, then also in this case the reinforcing bar 40 would be capable of having the aforedescribed decorative strip effect. The connection of this reinforcing bar is shown in FIG. 15 in two different alternative forms which can be used as desired. The inner coating 10 of this reinforcing bar 40 is provided with a foot 43 which projects into the interior 51 of the component 1 and which has on its underside a cushion-like coating 44 of softly resilient material to guarantee a protective bearing on the surface 4. This embodiment is particularly appropriate for components 1 of relative large width which require further support in addition to the webs 2 and 3.

Figure 16:
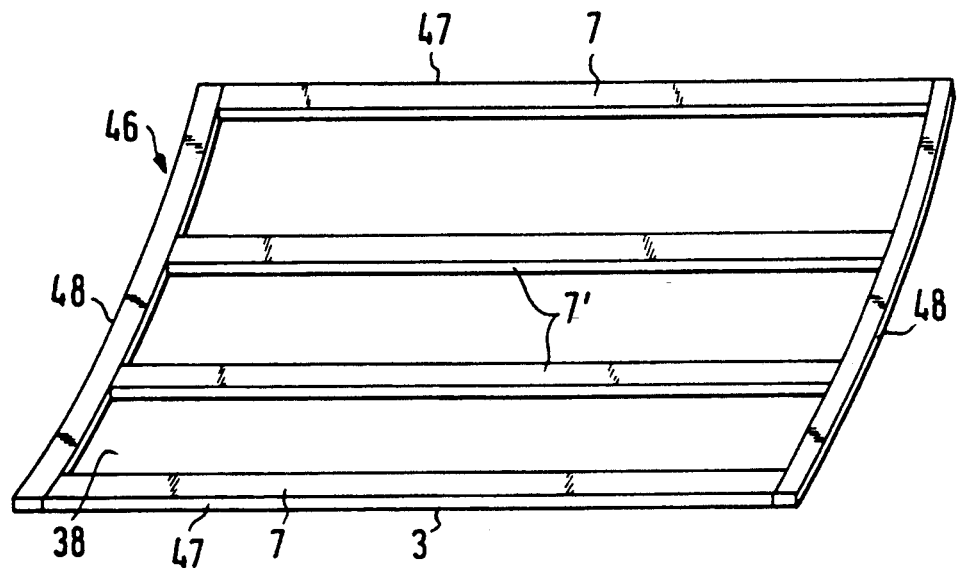
FIG. 16 shows a panel-shaped component diagrammatically and in plan view.
Figure 17:
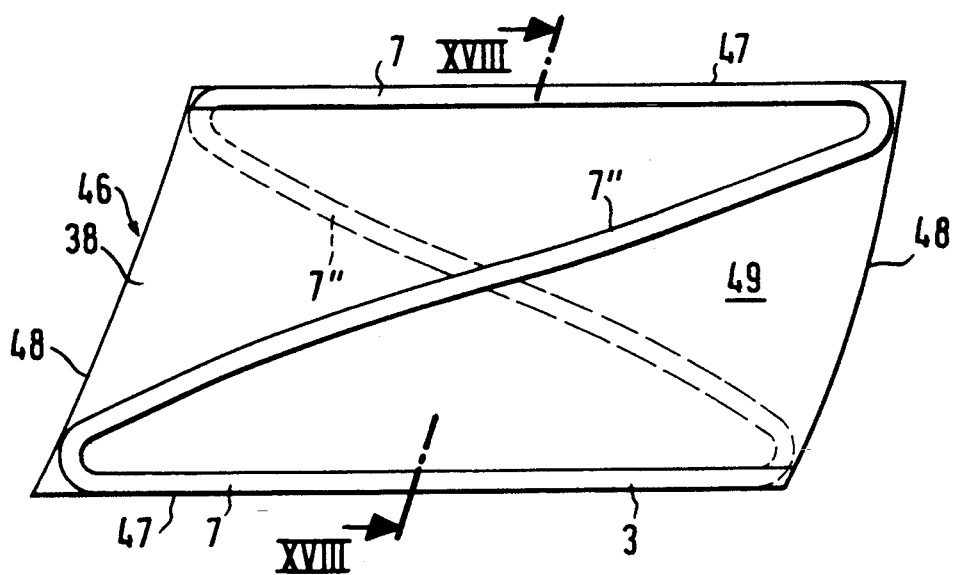
FIG. 17 shows a modified form of this embodiment.
Figure 18:
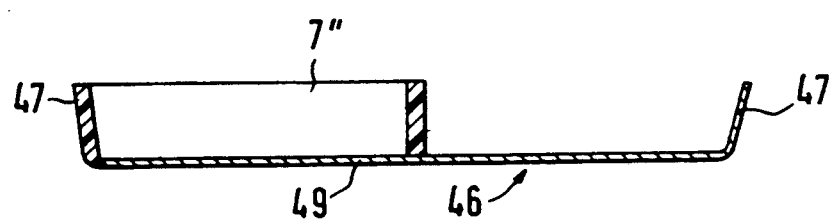
FIG. 18 shows a section taken substantially on the line XVIII—XVIII in FIG. 17.

Whereas the aforementioned embodiments are always based on the example where the component I is of a strip-like shape, FIGS. 16 to 18 show instead a panel-like component with a compact configuration such as is, however, used for cladding, for protection or the like on bodywork parts but which can also be used for other types of housings. This component is identified by reference numeral 46. Along its longitudinal edges 47 but also possibly on the transverse edges 48 reinforcing strips 7 of any above-described embodiment are in the manner indicated integrally molded in the same substance on the synthetic plastics material used for the component 46. Between the reinforcing bars 7 along the longitudinal edges 47 of this component 46, there are in the embodiment shown also additional reinforcing bars 7' which serve to strengthen or reinforce such a component due to its greater width. Also these reinforcing bars 7' can have an expediently softly resilient foot by which they are braced on the relevant under surface. An alternative arrangement is shown in FIG. 17. There, the two reinforcing bars 7 which extend along the longitudinal edges 47 are connected by a further reinforcing bar 7'' which extends diagonally over the panel-like part 49 of the component 46. Possibly, too, another such diagonally extending reinforcing bar 7'' may be provided to make an X-shaped configuration. It is obvious that also in this case the narrow edges 48 of the component 46 can be provided with further reinforcing bars if the need arises.

It lies within the framework of the invention for the support of the component not to be provided immediately under the outer webs 2, 3 but to shift the lips 12 which serve as a supporting means more towards the inside of these webs 2, 3 on the component 1, whereas the actual bottom edge of the web remains at a minimal distance from the bearing surface 4. As often happens in bodywork construction, it is in this way possible to carry out repainting work without being hindered by the component, such work being carried out to a point below the web thereof.

The synthetic plastics structural element in the form of a lateral strip 1, as has been described hereinabove with reference to FIGS. 1 to 18, and consisting of at least two reinforced inlay members in each case in the form of a bar 7 on the mutually oppositely disposed longitudinal edges of the synthetic plastics structural element and a structural element body (synthetic plastics body 6) integrally molded on these bars by an injection molding technique is in itself form-stable by virtue of the use of corresponding rigid synthetic plastics material for the molding 6. The reinforcing bars 7 reliably ensure that the lateral strip 1 undergoes the same heat expansion as the carrier (sheet metal of the bodywork) in the region of the places where it is fixed to and bears on the carrier. The shock absorption capacity of the lateral strip is not adversely affected by the reinforcement since by virtue of the curvature of the lateral strips (convex curvature away from the sheet metal of the bodywork), the elevated middle zone of the strip is the first to come in contact with the colliding object. In the event of impacts which are not excessively powerful, therefore, the impact is absorbed by the lateral strip 1 without any lasting deformation of the carrier. This also applies to the embodiment in FIG. 15, since there the support consists of softly resilient synthetic plastics material (a cushion-like coating 44) between foot 43 and carrier, possibly in conjunction with a corresponding deformability of the foot 43 itself, ensuring the desired spring travel. According to the selected material, chosen as a function of the relevant impact intensity, the impact in question is resiliently accommodated or is absorbed with a lasting deformation of the synthetic plastics structural element. An exchange of the lateral strip 1 which is in this way deformed after the impact is preferable to a repair of the sheet metal bodywork. According to the sketch in FIG. 13a which shows the principle of an idea, at least one of the ends of the lateral strip 1 can be constructed with an end piece 52 (in this case in the form of an oblique closing end wall 54 which may also be orientated at a right-angle to the longitudinal direction of the strip). Together with the structural element body (synthetic plastics body 6), this end piece can be placed in the injection casting mold and molded on to the inlay members (reinforcing bars 7) which are inserted into the mold, along the longitudinal edges of the lateral strip 1 which yields a smooth and unobtrusive transition between synthetic plastics body 6 and end piece 52. By virtue of the end piece 52, the cavity (interior space 51) formed between the curved lateral strip 1 and the carrier (sheet metal of the bodywork) is closed off, so avoiding penetration of moisture (risk of corrosion) and dirt.

In principle, the examples of embodiment to be described hereinafter are of the same constructions as the aforedescribed examples of embodiment, with the difference that now a soft synthetic plastics material is used for the synthetic plastics body 6'.

Figure 19:
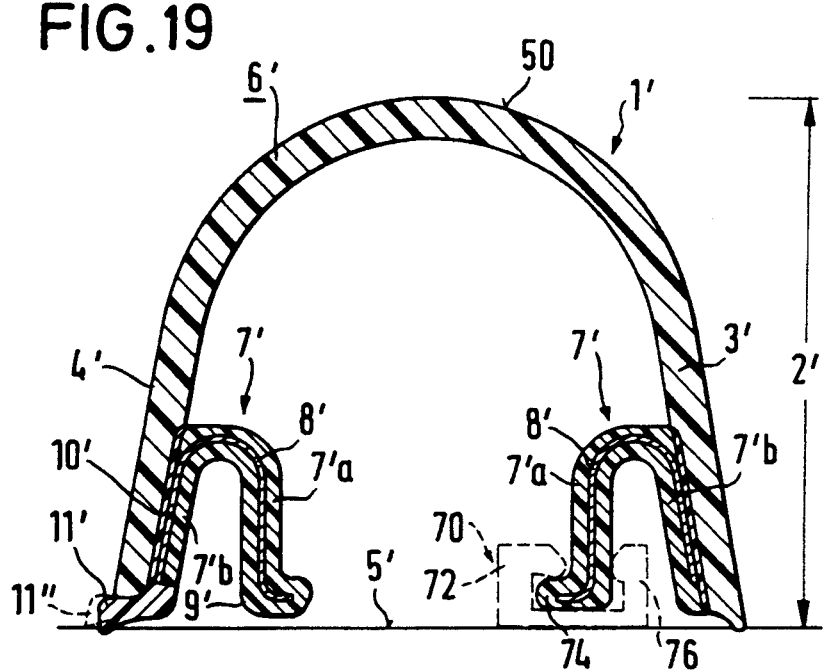
FIG. 19 shows a section through a further embodiment of the component.
Figure 20:
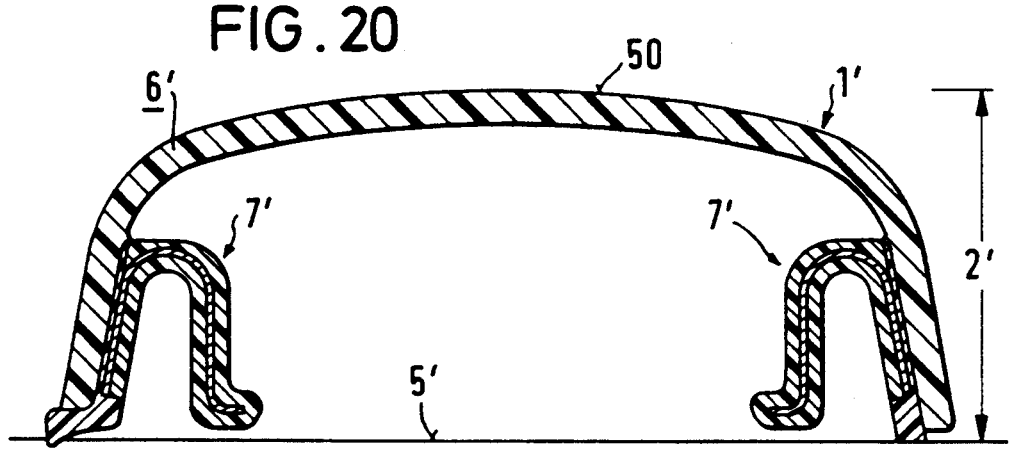
FIG. 20 shows a further embodiment likewise in section.

FIG. 19 shows in section a synthetic plastics structural element according to the invention, in the form of a lateral strip 1' which is relatively strongly curved in a convex shape having, compared with the embodiment in FIG. 20, a substantially greater height 2' while it is at the same time made correspondingly narrower. The lateral strip 1' shown in FIG. 19 has its longitudinal edges fixed on the appropriate carrier, particularly by adhesion or by means of clips. In FIGS. 19 and 20. a housing or bodywork surface is designated 5'.

The lateral strip1' according to FIGS. 19 and 20 consists of a structural element body (synthetic plastics body 6') of a rubber-like material or a synthetic plastics material (solid material or foamed material with a continuously smooth outer surface 50). Its form stability is imparted to the strip 1' by inlay members in the form of reinforcing bars 7" which extend lengthwise of the two longitudinal edges of the strips and which, according to the particular application involved, may be differently constructed, for example in accordance with the bars 7 of the embodiment described above with reference to FIGS. 1 to 18, so that they have a rigid shaped body 6. The strips or bars 7' are in each case mounted on the inside face of arms 3', 4' (longitudinal marginal portions of the molded body 6') and are, in fact, formed in the same substance by injecting the molded body 6' on the two bars 7' which have been laid into the injecting casting mold. The cross-sectionally U-shaped bar 7', which is open towards the carrier, in accordance with the embodiment shown in FIG. 19, comprises an inner metal reinforcement 8' in the form of a likewise U-shaped sheet metal strip instead of which it is also possible to use metal, particularly light metal sections or sheet metal sections of any other configuration. The metal reinforcement 8' is enclosed on all sides by synthetic plastics material, a coating 9' of rigid, possibly mineral fiber reinforced synthetic plastics material being integrally molded on the inside of the strip or bar and extending also over the outside of the inner flange 7'a of the strip or bar. On the outside of the outer member 7'b, on the other hand, there is an injected coating 10' of a soft plastics material on which in turn the flange 4' is integrally formed. The coating 10' is widened out at its bottom end to a lip 11'. In the drawings, generally the basic shape of the softly resilient supports is shown on the longitudinal edges of the strip 1'; when mounted on the carrier, there is a corresponding deformation as indicated on the left in FIG. 19 by a dotted contour line 11" on the lip 11'. This softly resilient support provides for a simultaneously sealing and protective bearing on the carrier with a compensation of manufacturing tolerances (of the carrier and/or of the synthetic plastics structural element).

On the right in FIG. 19 a broken line shows the outline of a fixing element 70 which can be rigidly connected to the sheet metal bodywork in a manner not shown (but particularly by adhesion or by clipping) and which can in each case be locked together with the inner flange or arm 7'a of the bar 7'. To this end, the fixing element has an upwardly projecting hook 72 which engages over the inwardly angled over bottom end 74 of the arm or flange 7'a. So that the end 74 is maintained in this position (the synthetic plastics body 6' consists of elastically yielding material), there is on that side of the arm 7'a which is remote from the hook 72 and serving as an element to prevent disengagement from the catch, an upwardly projecting bracket 76 on the fixing element 70. This can at any moment be opened out and moved away from the hook 72 to allow insertion of the end 74 into the fixing element 70.

Figure 21:
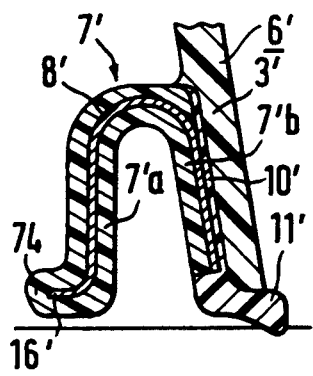
FIGS. 21 to 23 show various embodiments of reinforcing bars, in section.
Figure 22:
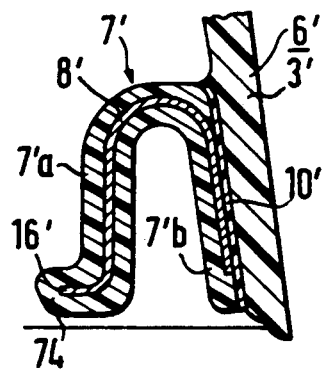
Figure 23:
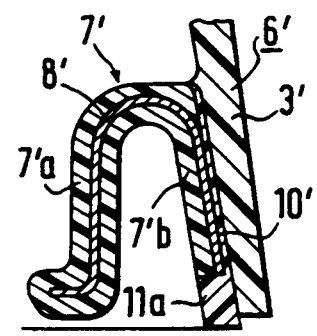

FIGS. 21 to 23 show alternative embodiments of the inlay member in the form of a reinforcing bar 7'. The embodiment according to FIG. 21 corresponds to the aforedescribed reinforcing bar 7' on the left in FIG. 19. The coating 10' on the outside of whichever is the outer arm 7'b is downwardly widened into the lip 11' which in turn serves as a resilient support on the bodywork. A further function of this coating 10' is that of facilitating integral molding of the relevant arm (in this case "') of the synthetic plastics body 6'.

The embodiment shown in FIG. 2, which corresponds to the right-hand half of FIG. 19, dispenses with the softly resilient sealing lip at the bottom end of the outer arm 7'b. Instead, the bottom end of the relevant arm 3' of the body 6' is of sealing-lip construction and is intended to bear directly on the bodywork.

Finally, in the case of the embodiment shown in FIG. 23, instead of the sealing lip 11' there is as an extension of the soft coating 10' downwardly a relatively compact and cross-sectionally rectangular soft coating 11' which is of the same thickness as the outer arm 7'b. The arm 3' of the synthetic plastics body 6' ends with a straight closure just above the soft coating 11a. The form of the embodiment corresponds to the right-hand half of FIG. 20.

All the embodiments according to FIGS. 21 to 23 have in common the aforedescribed cross-sectional form of reinforcing bar 7' and also the reinforcement with a metal reinforcement 8' of corresponding sectional configuration. In order to increase the strength of the angled-over end 74 of whichever is the inner arm 7'a and which serves as a fixing means according to FIG. 19, the corresponding arm of the metal reinforcement 8' is at the bottom end likewise provided with an inwardly directed angled-over portion 16'. For the rest, also other configurations of reinforcing bar 7' are conceivable according to whichever fixing system is envisaged.

Figure 24:
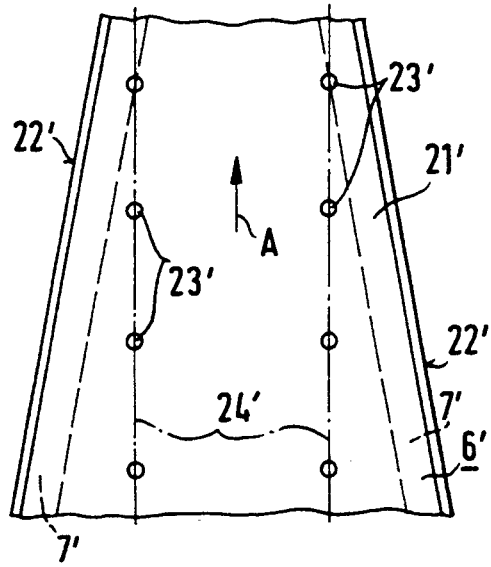
FIG. 24 shows a development of the curved synthetic plastics structural element with a trapezoidal outline.

By reason of the use of a softly resilient synthetic plastics material for the structural element body (body 6'), the relevant cross-sectional form of the synthetic plastics structural element (bar or strip 1') is determined by the form of the blank for the body 6' and the relative disposition of the reinforcing bars 7' fixed on the carrier. FIG. 24 shows a blank 21' for the molded body 6' and tapering in the longitudinal direction A (upwardly in FIG. 24) with, indicated by broken lines, reinforcing bars 7' on the oppositely disposed longitudinal edges 22'.

Figure 26:
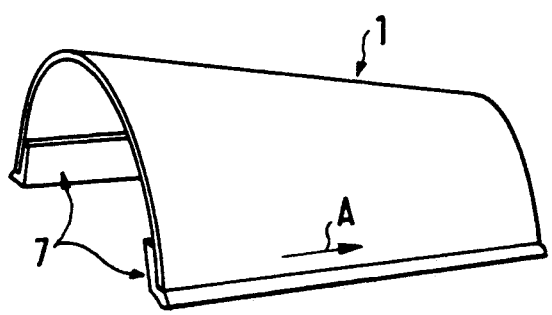
FIG. 26 is a perspective view of the embodiments shown in FIGS. 6 and 7 in the position of use.

If, then, the fixing elements 23' which serve to mold this body 6' on a carrier are disposed on two mutually parallel straight lines 24', then there is a form similar to FIG. 26 and which, for a constant width corresponding to the distance between the straight lines 24', has a height which reduces in the direction A.

Figure 25:
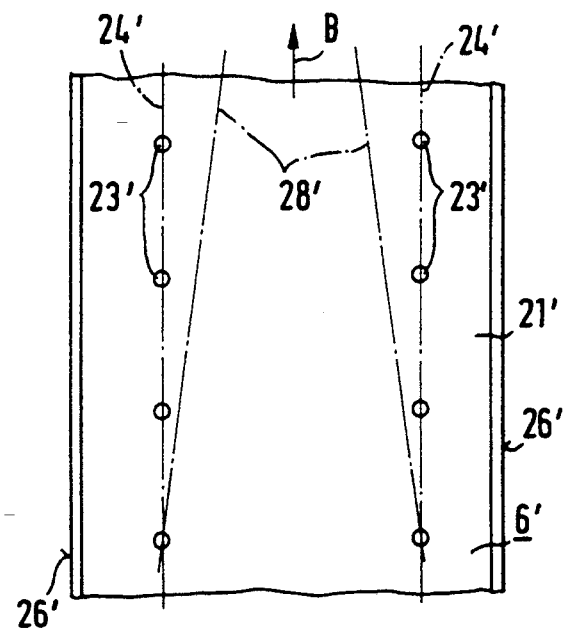
FIG. 25 shows a modified construction similar to FIG. 7 with a rectangular outline.

If, on the other hand, as shown in FIG. 25, a blank 21' is used which has parallel lateral edges 26', then one obtains a cross-sectional form which varies in the longitudinal direction of the strip when the fixing elements 23' are not disposed on mutually parallel straight lines 24' but on obliquely extending straight lines 28'. As the two straight lines 28' move towards each other in the direction of the arrow B in FIG. 25, then accordingly a construction will be obtained which has an overall height which increases in the direction B while at the same time enjoying a reduced width.

Figure 28:
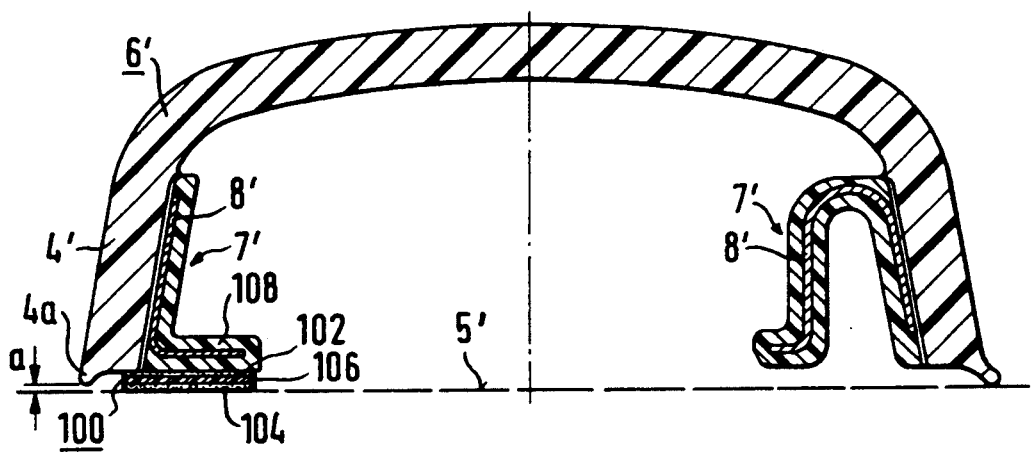

FIG. 28 shows two different types of fixing which are appropriate to all the aforedescribed embodiments. In the left-hand half of FIG. 28, the adhesion technique is shown with a double sidedly adhesive strip of adhesive 20 glued to the underside of the bar 7'. The adhesive coating glued onto the bar 7' is identified by reference numeral 102, while the layer of adhesive glued onto the carrier surface 5' is designated 104 and the intermediate bearer layer is designated 106. It will be appreciated that in the glued-on condition a clear gap a between the bottom end of the leg 4' of the body 6' and of the bodywork surface 5' is formed in the partially glued state. This clear distance is important to the stability of the glued joint. In fact, if the arm 4' were to bear on the bodywork surface 5' with pretension, then this pretension would lead to a loosening of the glued joint. In order to obtain a sufficiently large area of adhesion, the bottom horizontal arm 108 of the L-shaped angled-over strip 7' is extended inwardly by the appropriate amount. The strip 7' has an inner metal reinforcement 8' of a correspondingly U-shaped angled-over sheet metal section. The oppositely disposed strip 7' can be constructed in the same way and can be glued to the sheet metal of the bodywork (FIG. 28 must accordingly be regarded as having its right-hand half augmented).

As an alternative, it is also possible to achieve fitment by a separate fixing element, as has already been explained with reference to the right-hand half of FIG. 19 (fixing element 70).

The oppositely disposed strip 7 ' can be connected to the carrier by fixing elements 110 in an appropriate fashion (FIG. 28 must accordingly be augmented in its left-hand half)

Figure 29:
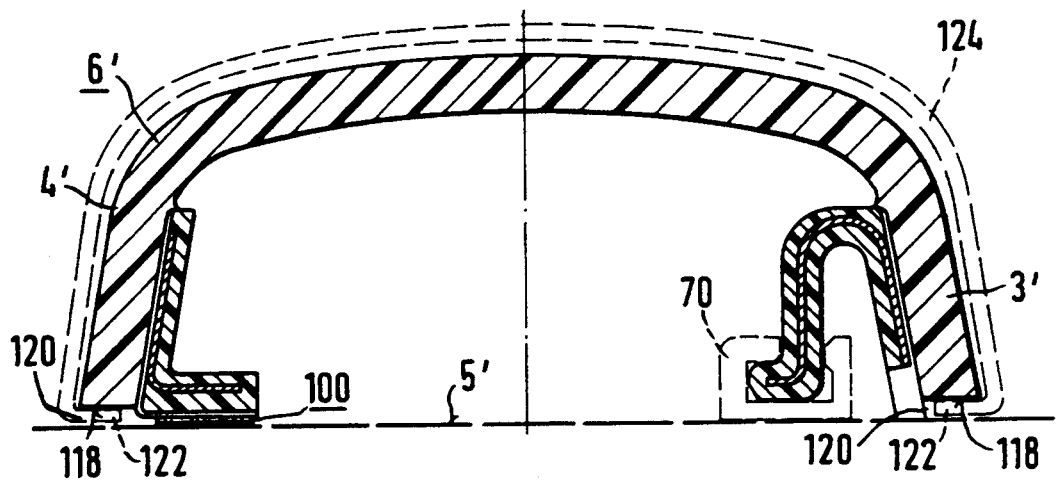

FIG. 29 in turn shows a body 6' with an optional fixing by a double-sided adhesive strip 100 or by means of separate fixing elements 70, and in contrast to FIG. 28 the bottom end face 118 of the relevant arm 3', 4' extends at a clear distance from and parallel with the bodywork surface 5'. It is possible to insert into the resultant group 120 an inwardly bent over edge 122 of a paintwork protective jacket 124. This jacket allows the metal platework of the body to be painted without at the same time painting the synthetic plastics structural element.

Figure 27:
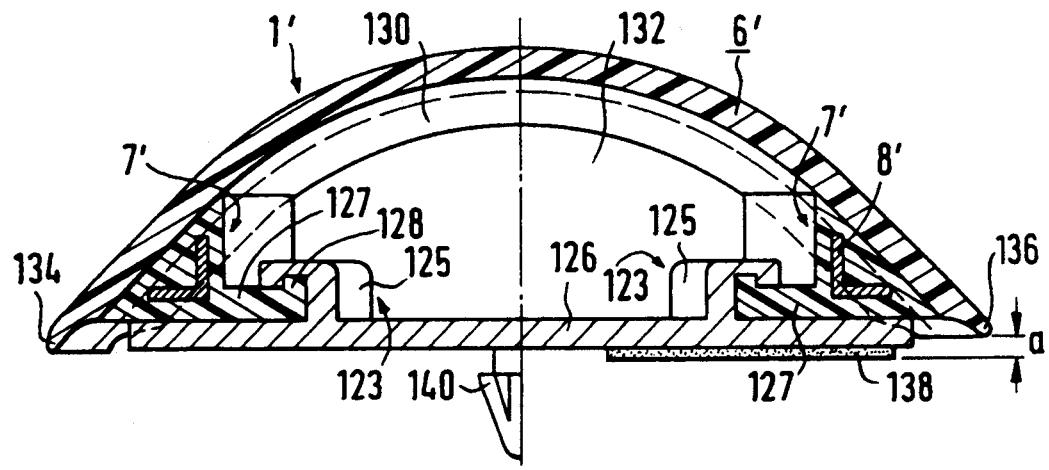
FIGS. 27 to 29 show sectional views of further embodiments.

Finally, the embodiment shown in FIG. 27 shows the use of a fixing plate 126 on which there are in turn the fixing elements 123 provided on mutually opposite longitudinal edges of the strip 1'. For the sake of simplicity, the fixing elements 123 are shown as hooks 125. They can be constructed in one piece with the fixing plate 126. The hooks 125 in turn engage around the inwardly directed arms 127 of the two bars 7', and in order to improve the reciprocal engagement these arms may be constructed at their outer end with upwardly directed hook noses 128. The two bars 7' are preferably reinforced, particularly by a metal reinforcement 8', e.g. in the form of the L-shaped profile shown.

The fixing elements 123 can, in keeping with the fixing elements 23' in FIG. 25, be disposed on mutually extending straight lines 28' on the fixing plate 126 so that the conical shape shown in FIG. 27 is obtained here. Also here, with a corresponding shaping of the injection casting mold, it is possible to provide a closure for the interior 130 at both axial ends of the synthetic plastics structural element by correspondingly shaped end walls 132 (axially formed end piece).

Corresponding to the left-hand half of FIG. 27, the fixing plate can be clipped to the carrier (sheet metal of the bodywork) (clip head 140, in which case then it is possible for the peripheral edge of the body 6' to rest on the bodywork in the form of a sealing lip 134.

In the case of a glued fixing plate 126, particularly by means of a double-sided strip 138 (see the right-hand half of FIG. 27), it is again 'necessary to maintain a minimal clear distance a of, for example, 0.1 to 1 mm between the bodywork surface and the peripheral edge of the structural member 6' which is constructed as a marginal lip 136.

FIG. 30 shows yet another embodiment of a molded strip element pursuant to the invention, in which the synthetic plastic body 6, in cross-section, is contoured to a desired shape, for example a flattened S- or U-shape. Two reinforcing bars 207, 207' are attached to the inner side of the contoured body 6. As oriented in FIG. 30, the lower reinforcing bar 207 is mounted to the inner face of the contoured body 6 at a distance from the lower end 6a. The end 6a is curved toward the bearing surface 4, and the reinforcing bar 207 is dimensioned, so that a drain opening 220 is formed between the end 6a of the contoured body 6 and the bearing surface 4, to permit moisture to escape from behind the contoured body.

The lower reinforcing bar 207 extends parallel to the lower edge of the contoured body 6, and has a generally U-shaped cross-section. The uppermost leg 210 of the U-shape is engageable in a clip 300 for mounting to the bearing surface 4. The lower leg 211 of the U-shape has a lip 12 formed thereon so as to contact the bearing surface 4.

A metal reinforcement 8 is contained within the reinforcing bar 207, and has a cross-section which generally corresponds to the cross-section of the reinforcing bar 207. In the embodiment illustrated in FIG. 30, the metal reinforcement 8 has a roughly U-shape with downwardly projecting members at the ends of the legs of the U-shape.

The upper reinforcing bar 207' has a lower leg 210' similar to the leg 210 of the lower reinforcing bar 207.

This leg 210' also engages in the clip 300. The other leg 211' of the reinforcing bar 207' is essentially parallel to the bearing surface 4. A connecting part 212' connects the legs 211', 210'. The connecting part 212' has a contour which corresponds to the inner surface of the contoured body 6, so as to permit secure engagement thereto. At the uppermost end of the leg 211', a lip of soft resilient material is provided, by being connected to either the leg 211' or the end 6b of the contour body 6, so as to contact the bearing surface 4 as was discussed previously in connection with the leg 211 of the lower reinforcing bar 207. The upper reinforcing bar 207' is dimensioned so that only the lip comes into contact with the bearing surface 4 when the leg 210' is engaged in the clip 300.

The clip 300 can be fastened to the bearing surfacer i.e. a car body, by a pin 301. However, the clip can also be attached to the car body by an adhesive, as discussed previously in connection with FIG. 27.

As with the previously discussed embodiments, in the embodiment of FIG. 30, both reinforcing bar members extend parallel to the respective upper and lower lateral edges of the contoured body 6.

The aforedescribed embodiments differ above all by a good attachment of the synthetic plastics structural element to the relevant carrier via the reinforced longitudinal edges, possibly provided with softly resilient supports, and by good shock absorption without deformation of the carrier, while being of favourably costed manufacture. What must be stressed, too, is the pleasant appearance of the synthetic plastics structural element without any disturbing transitional seams and without externally recognisable fixing means Instead of two strips 7', it is possible in certain situations also to provide one correspondingly shaped strip which extends from one peripheral edge of the structural element to the other.

I claim:

1. An assembly, comprising a heat expansible carrier having a mounting surface, and a strip element mounted on said mounting surface of said carrier, said strip element comprising:
    an elongated body member having a U-shape cross-section formed by a central member and two lateral members, each lateral member comprising a web having a first end, at which it is attached to said central member at a respective one of opposite lateral ends of said central member, and having a second end remote from said central member, at which it is attached to said mounting surface, so that said central member is spaced from said mounting surface of said carrier and defines together with said lateral members and said mounting surface a hollow inner space;
    two elongated reinforcing bar members, extending at said inner side of said body member parallel to respective lateral members and mounted to said inner side, with at least one of said two bar members being mounted to only an inner side of a respective one of said two lateral members, said bar members insuring approximately equal thermal expansion of said mounting surface of said carrier and said second ends of said webs; and
    an end part, provided at least at one of opposite longitudinal ends of said body member for connecting said two laterals members;
    wherein said strip element is an integral structure formed by concurrently injection molding of said body member and said end part onto said two bar members.

2. An assembly, comprising a heat expansible carrier having a mounting surface, and a molded strip element mounted on said mounting surface of said carrier, said molded strip element comprising:
    an elongated body member, having a U-shaped cross-section formed by a central member and two lateral members, each lateral member comprising a web, having a first end at which it is attached to said central member at a respective one of opposite lateral ends of said central member, and having a second end remote from said central member, at which it is attached to said mounting surface, so that said central member is spaced from said mounting surface of said carrier and defines, together with said lateral members and said mounting surface a hollow inner space;
    two elongated reinforcing bar members extending at said inner side of said body member parallel to respective lateral members and mounted to said inner side, with at least one of said two bar members being mounted to only an inner side of a respective one of said two lateral members, said body member being injection molded onto said two bar members so that said two bar members are attached to said lateral members, respectively, and extend in regions of said second ends of said webs, respectively;
    wherein each of said two bar members has a sealing lip for bearing on said mounting surface of said carrier, and at least one of said two bar members has an outer surface portion remote from the inner space and extending adjacent to said outer side of said body member, said outer surface portion having at least one of a different color and a different profile than an adjacent outer side portion of said body member.

3. An assembly according to claim 2, wherein said outer surface portion has a metallic appearance.

4. An assembly according to claim 2, further comprising a further reinforcing bar element extending between said two webs, said body member being injection molded onto said bar element.

5. An assembly according to claim 4, wherein said bar element extends diagonally inside the inner space of said body member.

6. An assembly according to claim 4, wherein said bar elements has an X-shape.

7. An assembly according to claim 2, wherein said sealing lip is resilient.

8. An assembly, comprising a heat expansible carrier having a mounting surface, and a strip element mounted on said mounting surface of said carrier, said strip element comprising:
    an elongated body member having a contoured cross-section, formed by a central member and two lateral members, each lateral member comprising a web having a first end at which it is attached to said central member at a respective one of opposite lateral ends of said central member and having a second end remote from said central member, at which it is attached to said mounting surface so that said central member is spaced from said mounting surface of said carrier and defines, together with said lateral members and said mounting surface, a hollow inner space;

two elongated reinforcing bar members extending at said inner side of said body member parallel to respective lateral members and mounted to said inner side, with at least one of said two bar members being mounted to only an inner side of a respective one of said two lateral members, said bar members insuring approximately equal thermal expansion of said mounting surface of said carrier and said second ends of said webs; and an end part provided at least at one of opposite longitudinal ends of said body member for connecting said two lateral members;

wherein said strip element is an integral structure formed by concurrently injection molding of said body member and said end part onto said two bar members.

9. An assembly according to claim 8, wherein one of said bar members is mounted at a distance from a respective one lateral member, and another one of said bar members has a shaped cross section including a first leg mountable to said mounting surface of said carrier and a second leg extending parallel to said carrier and having a soft resilient lip at its end for contacting said mounting surface.

10. An assembly according to claim 8, wherein at least one of said reinforcing bar member comprises an extruded part having a coextruded soft resilient layer for bearing on said mounting surface.

11. An assembly according to claim 8, wherein at least one of said bar members is made of sheet metal having a layer of a plastic material extruded onto said sheet metal.

12. An assembly according to claim 8, wherein at least one of said reinforcing bar members is formed of extruded mineral fiber-reinforced plastic material.

13. An assembly according to claim 8, wherein at least one of said reinforcing bar members is formed of extruded rigid plastic material.

14. An assembly according to claim 8, further comprising a soft, resilient supporting layer provided on one of at least one web and at least one reinforcing bar member for bearing on said mounting surface.

15. An assembly according to claim 8, further comprising a sealing lip provided on one of at least one web and at least one reinforcing bar for bearing on the surface of the carrier.

16. An assembly according to claim 8, wherein at least one reinforcing bar member is provided with a metal reinforcement, applied to at least that side thereof which faces toward the inner space.

17. An assembly according to claim 8, further comprising fixing elements integrally extruded onto at least one of said reinforcing bar members for one of direct fixing on said mounting surface and fixing on a fixing panel to be mounted on said mounting surface.

18. An assembly according to claim 8, further comprising supporting elements integrally extruded onto at least one of said reinforcing bar members, said elements projecting into the inner space and having a supporting layer of a soft, resilient material for bearing on said mounting surface.

19. An assembly according to claim 17, wherein said fixing elements are reinforced with one of sheet metal and mineral fibers.

20. An assembly according to claim 18, wherein said supporting elements are reinforced with one of sheet metal and mineral fibers.

21. An assembly according to claim 11, wherein said sheet metal is provided with stamped-out portions to facilitate bending of said strip element.

22. An assembly according to claim 11, wherein at least one further reinforcing bar member is provided in a middle portion of said body member in a spaced-apart relationship relative to said second ends of said webs.

23. An assembly according to claim 22, wherein said at least on further reinforcing bar member comprises a bracing web for supporting said strip element on said mounting surface and which is resilient in a direction perpendicular to said mounting surface.

24. An assembly according to claim 8, comprising an outwardly opened groove between each second end and said mounting surface for receiving an edge of a paintwork protecting jacket.

25. An assembly according to claim 8, wherein at least one of said reinforcing bar members has a coating of adhesive material affixable to said mounting surface.

26. An assembly according to claim 8, wherein said body member is formed from a soft plastic material.

27. An assembly according to claim 26, further comprising fixing elements for mounting said strip element on said mounting surface and fixing elements having a cross section varying along a longitudinal axis of said body member.

28. An assembly according to claim 27, where said fixing elements engage said reinforcing bar members.

29. An assembly according to claim 27, wherein the fixing elements are provided on a common fixing plate mountable on said mounting surface.

30. An assembly according to claim 29, wherein said common fixing plate has a coating of adhesive material affixable to said mounting surface of the carrier.

* * * * *